United States Patent [19]

Crowley

[11] E Re. 29,777

[45] Reissued Sep. 26, 1978

[54] CONCRETE TANK OF PRECAST CONCRETE PANELS WITH PRETENSIONED BEAM MEANS

[76] Inventor: Francis X. Crowley, 24 Lanark Rd., Wellesley, Mass. 02181

[21] Appl. No.: 818,244

[22] Filed: Jul. 22, 1977

Related U.S. Patent Documents

Reissue of:

[64] Patent No.: 4,015,383
Issued: Apr. 5, 1977
Appl. No.: 576,121
Filed: May 9, 1975

U.S. Applications:

[63] Continuation of Ser. No. 418,443, Nov. 23, 1973, abandoned.

[51] Int. Cl.[2] ..... E04H 12/16

[52] U.S. Cl. ..... 52/224; 52/169.4; 52/227; 52/246; 52/248; 52/259; 52/264

[58] Field of Search ..... 52/224, 264, 332, 341, 52/169.4, 396, 249, 227, 259, 248, 247, 246, 245, 340

[56] References Cited

U.S. PATENT DOCUMENTS

| | | | |
|---|---|---|---|
| 796,669 | 8/1905 | Mather et al. | 52/248 |
| 1,161,973 | 11/1915 | Reynolds | 52/248 X |
| 1,162,085 | 11/1915 | Layton | 52/248 |
| 1,251,230 | 12/1917 | Holland et al. | 52/248 X |
| 1,295,341 | 2/1919 | Madsen | 52/248 X |
| 2,052,934 | 9/1936 | Mire | 52/248 |
| 2,275,523 | 3/1942 | Goldbeck | 52/248 X |
| 2,937,065 | 5/1960 | Harza | 52/396 |
| 3,180,057 | 4/1965 | Pritzker | 52/224 X |
| 3,217,451 | 11/1965 | Closner | 52/224 |
| 3,241,278 | 3/1966 | Magers, Jr. | 52/224 |
| 3,280,525 | 10/1966 | Crowley | 52/227 X |
| 3,385,016 | 5/1968 | Crom | 52/224 |
| 3,504,474 | 4/1970 | Dykmars | 52/224 X |
| 3,824,751 | 7/1974 | Shelander | 52/223 R X |

FOREIGN PATENT DOCUMENTS

| | | | |
|---|---|---|---|
| 221,262 | 10/1961 | Austria | 52/248 |
| 788,684 | 10/1935 | France | 52/248 |
| 1,011,931 | 7/1952 | France | 52/248 |
| 1,524,148 | 4/1968 | France | 52/224 |
| 1,527,160 | 4/1968 | France | 52/248 |
| 1,065,539 | 4/1967 | United Kingdom | 52/224 |

*Primary Examiner*—Leslie Braun

[57] ABSTRACT

A tank constructed of either cast-in-place concrete, or of precast panels of concrete which are separated from each other around the periphery of the tank with the open spaces between the panels being filled with concrete filler units poured in place. One or more collar-like horizontally-lying concrete beams surround the wall of the tank and reinforce it. Each beam is reinforced by one or more tendons encased within the beam.

5 Claims, 14 Drawing Figures

FIG. 3
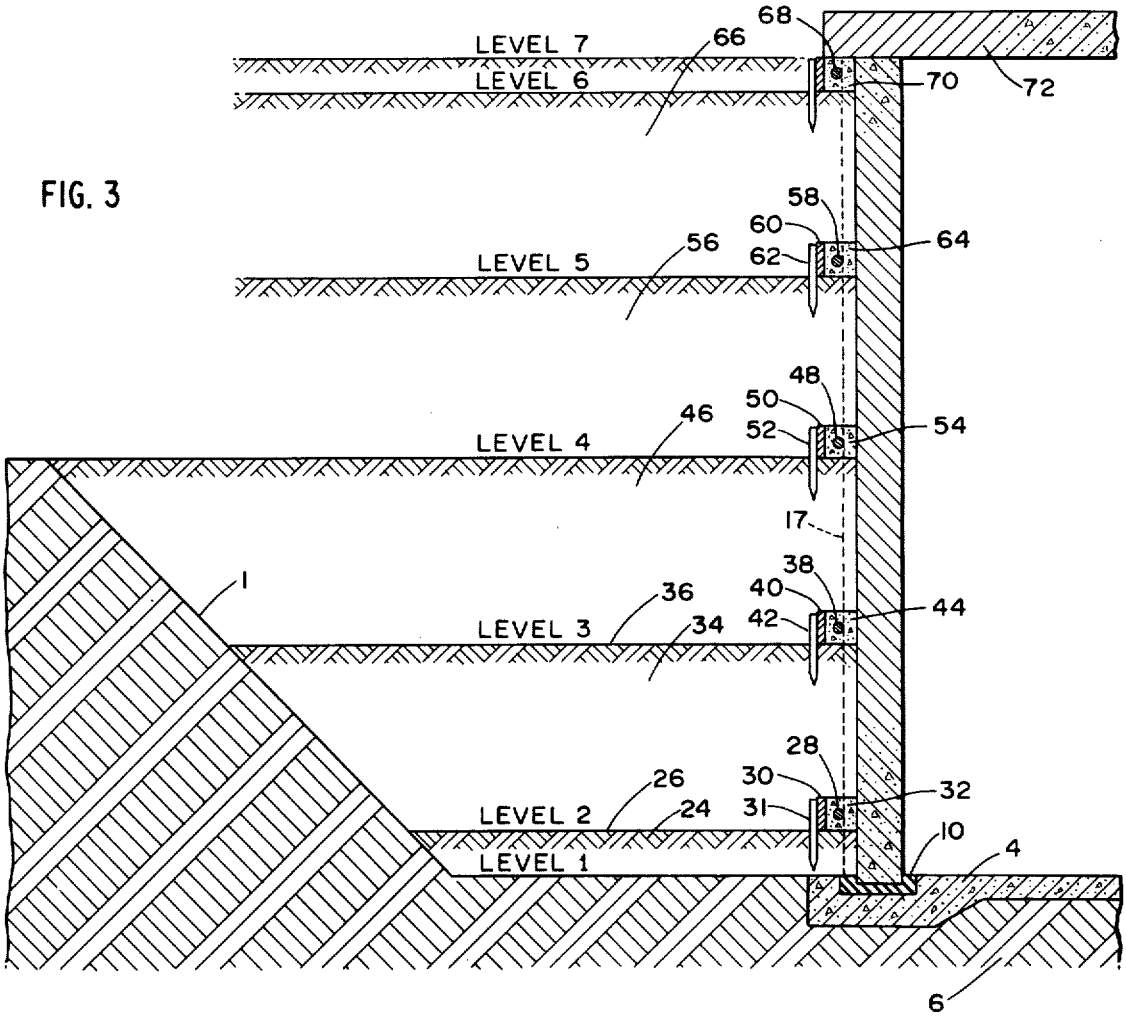
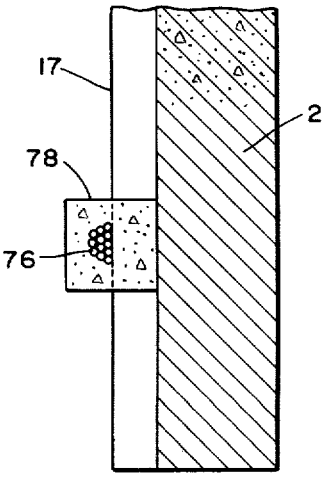
FIG. 4
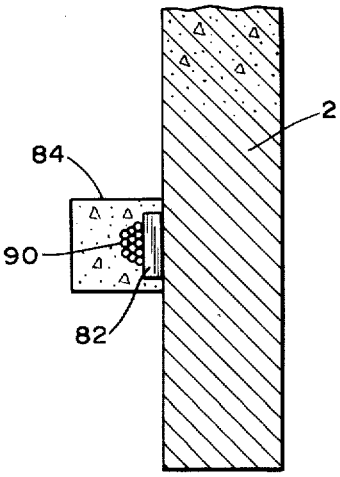
FIG. 6
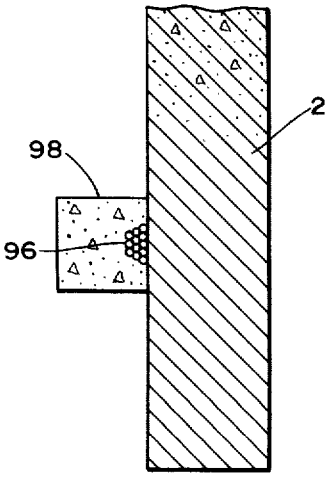
FIG. 7

FIG. 5
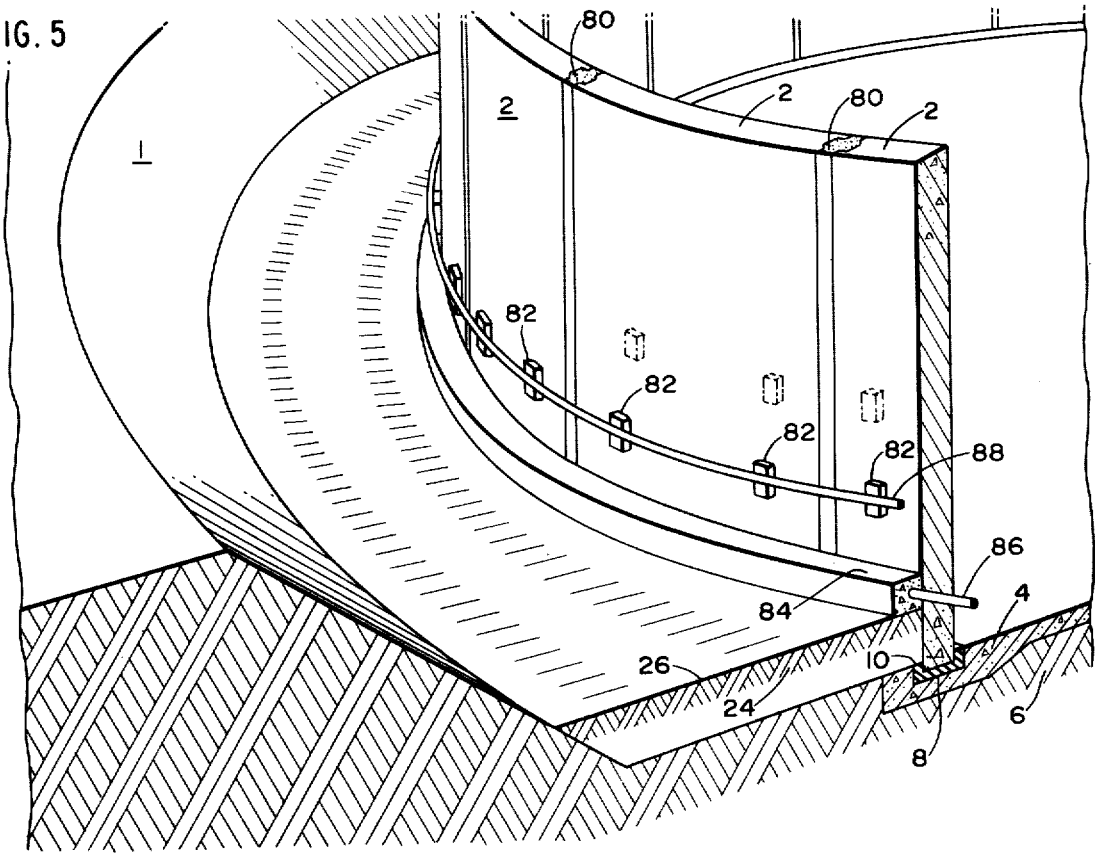
FIG. 8
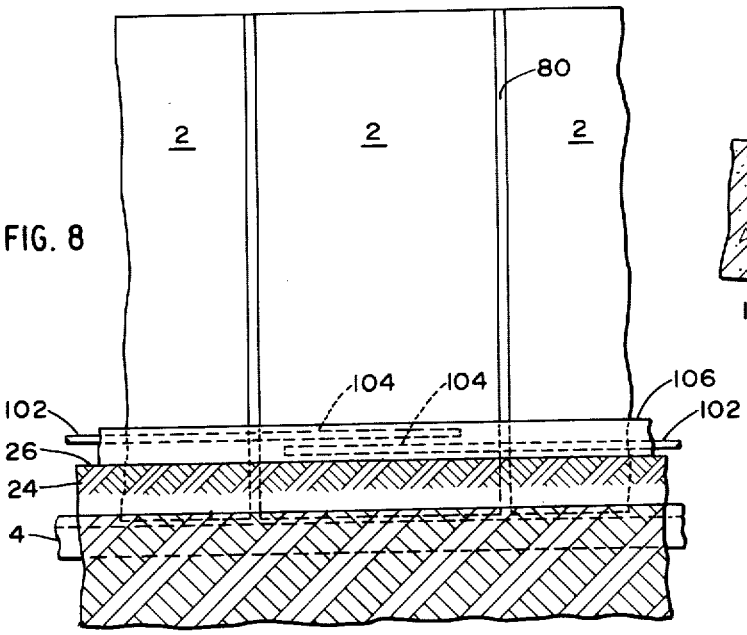
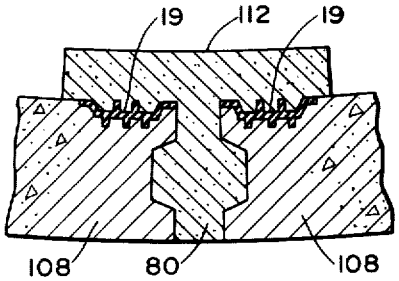
FIG. 10
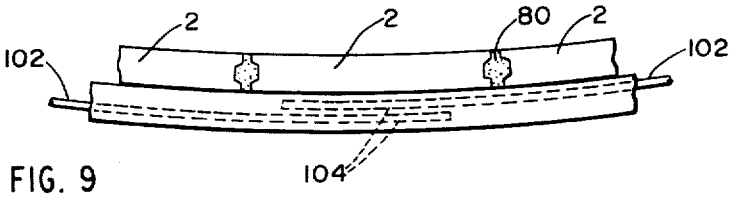
FIG. 9

FIG. 11
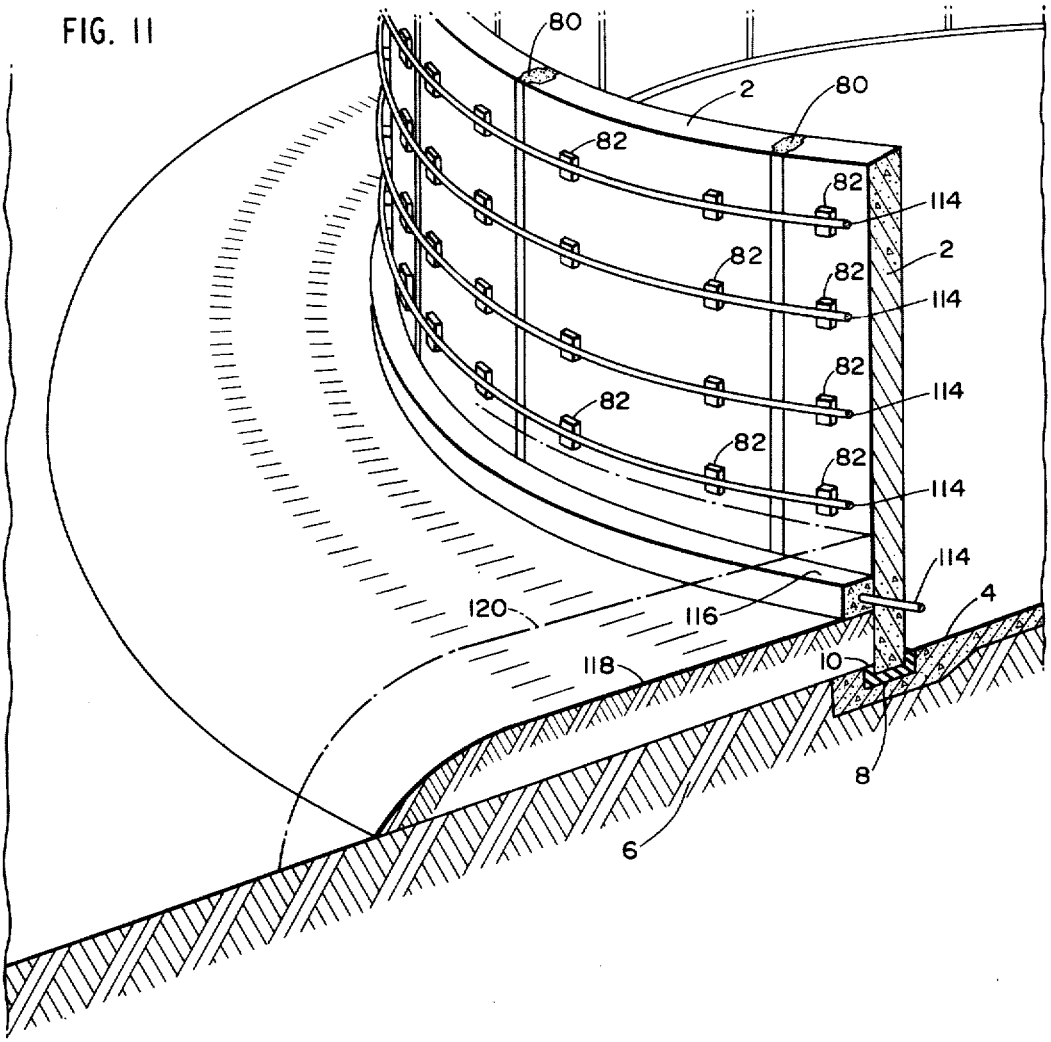
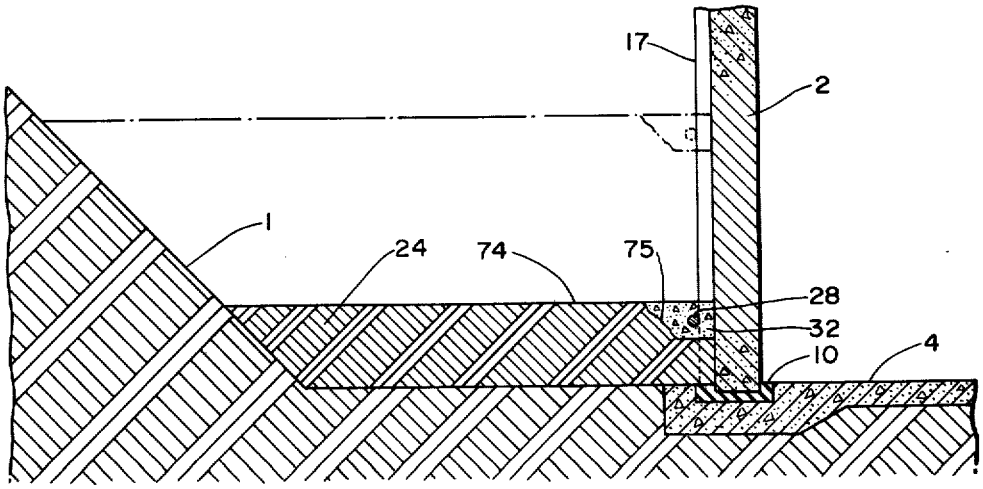
FIG. 12

CONCRETE TANK OF PRECAST CONCRETE PANELS WITH PRETENSIONED BEAM MEANS

Matter enclosed in heavy brackets [ ] appears in the original patent but forms no part of this reissue specification; matter printed in italics indicates the additions made by reissue.

This is a continuation of application Ser. No. 418,443, filed Nov. 23, 1973, now abandoned.

BACKGROUND OF THE INVENTION

It is known to construct a concrete tank using precast concrete panels which are cast on the site one on top of the other, these panels then being erected on a foundation with spaces being left between the panels. Using proper form boards, the spaces between the panels are then filled with concrete which is poured at the site. After the latter has cured, the forms are removed. Such tanks are then coated on one or both sides with material such as pneumatically placed mortar and are then stressed with wires wrapped under tension around the tank. See, for example, U.S. Pat. Nos. 3,280,525 and 3,408,784 issued respectively on Oct. 25, 1966 and Nov. 5, 1968.

However, the type of tank shown therein, and other known tanks, are relatively expensive in certain cases, in view of the additional steps involved in both the construction of the tank itself, and the necessity of transporting to the site the equipment for applying the pneumatically placed mortar.

In addition, when it is desired to pour concrete structures during severely cold weather, elaborate precautions must be taken to insulate the concrete against sudden changes in temperature. If, for example, the tanks described in U.S. Pat. Nos. 3,280,525 and 3,408,785 are wire wrapped in freezing weather, normally the entire wall area of the tank must be enclosed and heated to prevent frost from reaching the protective coating of pneumatic mortar. This entails a loss of time, of course, but more important, the cost of this protection makes it economically prohibitive, resulting in a shutdown of this work in the winter months [of] *in* many sections of the country.

For more than thirty years, pneumatically placed mortar has been used as the exclusive material for protection of prestressing wire in wire wrapped tanks, despite the fact that its cost is high, the quality control is difficult and winter protection is prohibitively expensive.

There is a need, therefore, for a simple way of construction and reinforcing concrete tanks which will be of higher quality and less expensive than those of the prior art, and which makes it economically feasible to build them during the winter months.

SUMMARY OF THE INVENTION

Accordingly, it is the prime purpose of this invention to solve the above problems, and to this end and in regard to the tank itself, one of the objects of the invention is the provision of a tank made of precast panels which does not require additional finishing operation after the precasting process.

A second object of the invention is the provision of tanks of the above kind in which external reinforcing means may be provided during cold weather at reasonable cost.

Another object of the invention is the provision of tanks of either of the above kinds in which the walls of the tanks are strengthened by external circular beams which are reinforced by steel reinforcing means.

A still further object of the invention is the provision of a tank in which minimum external reinforcing need be used, and which requires minimum form work during construction.

Yet another object of the invention is the provision of a tank in which protective coatings such as pneumatically placed mortar may be eliminated and the metal tension rings are spaced away from the liquid containing wall with the metal entirely surrounded by a protective coating.

Another object of the invention is the provision of methods for constructing any of the tanks above which are economical and thereby reduce the cost of the tank.

In regard to the method of constructing the tank of this invention, a first object is the provision of steps of construction utilizing, as one of the steps, an external back-fill built up in successive layers, each layer providing a work surface on which to perform construction acts. The back-fill of the next layer constituting, in addition to providing the next work surface, a protection for the cast concrete against severe cold, during setting; and reinforcing for the tank wall in use.

A second object of the method of this invention is the provision of steps of construction and manners of reinforcing, which are applicable to all sizes of tanks, use a minimum of concrete for a given size and capacity of a tank, may be used in all kinds of weather and in all seasons, and which are economical as compared to prior art methods.

Other objects and advantages will be in part apparent and in part pointed out hereinafter.

The invention accordingly comprises the elements and combinations of elements, arrangements of parts, features of construction, and steps and sequence of steps of construction, all of which will be exemplified in the structures and in the methods of making the same hereinafter described, and the scope of the application of which will be indicated in the appended claims.

In the accompanying drawings, in which one of the several embodiments of the invention is disclosed;

FIG. 3 is a section of a portion of a construction site for the tanks of this invention, the drawing illustrating successive steps in a first embodiment of the method of construction of the tanks of this invention;

FIG. 4 is an enlarged fragmentary elevation showing a portion of a panel wall and circular reinforcing means comprising one detail of the first embodiment of the invention;

FIG. 5 is a simplified illustration of a portion of a second structural embodiment of the invention, showing the use of precast panels using spacers for the reinforcing wires different from the pilasters of FIGS. 1–4, and also illustrating a second embodiment of the method of this invention;

FIG. 6 is a [cross-sectinal] *cross-sectional* elevation of *a portion of* the second embodiment of this invention, showing the use of a tendon comprising plural wires per circular beam.

FIG. 7 is a cross-sectional elevation of a portion of a third structural embodiment of the invention, in which no spacers for the reinforcing wires are used.

FIGS. 8 and 9 are respectively elevation and plan views of a portion of a fourth structure embodiment of the invention.

FIG. 10 is a plan view in section of a portion of a tank wall used in a fifth structural embodiment of the invention.

FIG. 11 is an illustration of a portion of a tank wall, showing steps of a third embodiment of the method of this invention;

FIG. 12 is a view of a portion of a tank wall, illustrating the use of earth troughs rather than form boards, to contain the poured cement of the beams of this invention.

In the drawings, similar reference characters indicate corresponding parts throughout the several views. In addition, dimensions of certain of the parts, as shown in the drawings, may have been modified and/or exaggerated for the purpose of clarity of illustration and understanding of the invention.

Figure 1:
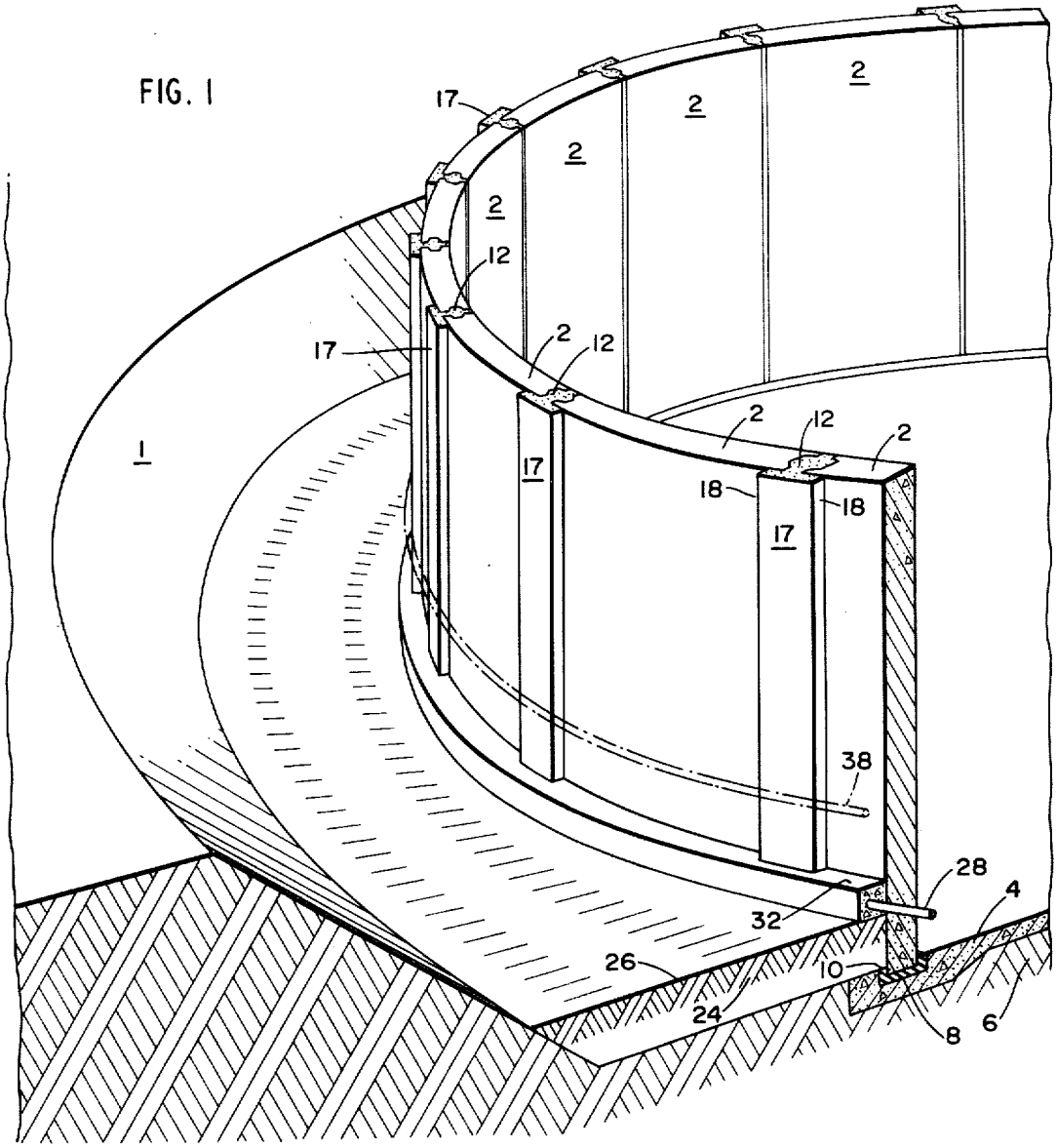
FIG. 1 is a simplified illustration of a first structural embodiment, showing a portion of a tank wall of this invention, the portion illustrating the tank after an initial phase of its construction.

Referring to FIG. 1, there is shown a portion of a tank wall of a first embodiment of the tank of this invention, the portion shown illustrating precast concrete panels 2 arranged, in exemplary manner, in a circle on a concrete base 4. The base 4 may conveniently be placed in a pit or excavation 1. [it] *It* will be understood that since only a portion of the tank is shown, the precast panels shown represent only a portion of the total number of such panels needed to complete the tank. The panels 2 rest on a base 4, for example a base of concrete, which in turn rests on a level foundation such as earth 6. Desirably, a groove 8 is precast in the base 4, and then the bottom ends of the precast panels rest in this groove, seal 10 being provided as shown in customary manner. The seal 10 may be mortar placed after the surfaces of the groove have been treated with a bonding agent. If desired, a suitable water stop may be used.

Figure 2:
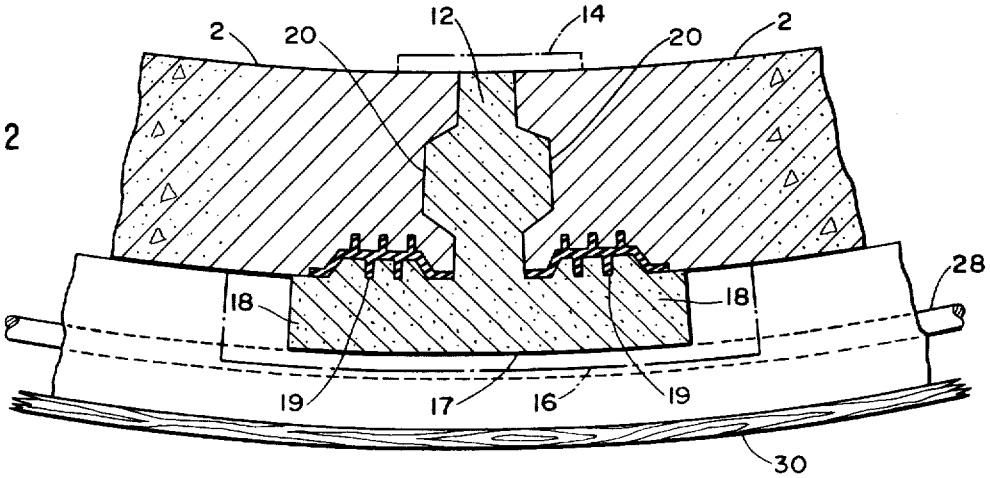
FIG. 2 is a plan view, enlarged, of a portion of the FIG. 1 illustration, given to show the construction of pilasters and water stop means used in the first embodiment of the invention.

The panels 2, while being placed on base 4, are arranged so that spaces are left between the adjacent vertical edges. These spaces are filled by a cast-in-place concrete to form the filler units 12. In the FIG. 2 embodiment, the filler units 12 are formed by establishing in conventional manner a form board 14 (see FIG. 2) on the inside walls of the panels, and then a suitable form board 16 on the outside walls. By shaping the outer form boards as shown, the resulting filler unit for this embodiment is in the form of pilasters whose outer walls have the vertical flange portions 18 which overlap the outer faces of edge portions of adjacent panels.

Preferably, water stops 19 have been cast in the edges of the panels 2, [there] *these* being, for example, one of several kinds manufactured and sold by Weather Guard Enterprises, 2339 Chattertown Avenue, New York, New York, as explained in the co-pending U.S. patent application of Francis X. Crowley, Ser. No. 354,497, filed Apr. 26, 1973, and now abandoned. (For purposes of clarity of the drawings, the water stops are not illustrated in FIG. 1).

If desired, and as shown, the adjacent vertical edges of the panels may be provided with the grooves 20 which are filled with the concrete of the pilaster, thus giving increased strength to the filler units. By the use of the pilaster construction, the joint width (i.e., the width of the individual filler units) can be made a minimum.

As an example of the relative dimensions of the panels and the filler units, the panels may be, for example, 13 feet wide and 20 feet long, ie., the wall may be 20 feet high; the portions 18 of the pilasters may be 3 inches thick and may overlap the face portions of the panels by a matter of 6 to 8 inches. The panels may be 4 to 8 inches thick and the thickness (between adjacent panels) of the pilasters may be in the order of 6 inches between the grooves 20 and 3 inches between the remaining portions of the panel edges. These dimensions are given only as exemplary.

It will be understood that the pilasters forming the filler units 12 preferably extend the entire length of the panels 2 from the top thereof down to the top surface of the base 4.

After the concrete of the pilasters has set, suitable insulation having been provided if required by cold weather, the forms and insulation are removed, and then in a first embodiment of the method of this invention, a layer of earth 24 (preferably part of the earth which was removed to make the excavation 1 in which the base 4 is established, if the tank is so located) is moved back into place and surrounds the tank as shown. This earth is compacted, and constitutes a back-fill which has a top surface 26 (level 2). An exemplary thickness of this first back-fill layer, may be approximately 1 foot thick or deep. Exemplary width may be 8 feet, but of course this can be varied.

Of course, the tank does not have to be located in an excavation. It can be located on level terrain, and an embankment may be suitably provided for the purpose described in the above embodiment as to each level of dirt to act as a working surface, and as protection for a poured concrete beam during setting of the latter. (See FIG. 11).

In the first embodiment of the process of erecting the tank, the next step is to wrap a reinforcing tendon 28 about the tank, this tendon being spaced from the outer face of the panels by the exposed outer face of the pilasters which form part of the filler units 12. (Throughout the description and claims the word "tendon" is used to describe either a single metal wire or rod, or a plurality of wires or rods placed closely together to form a band of wires or rods. This same remark applies to FIGS. 3, 5, 11 and 12. Where plural wires are used to make up the bands 76, 90 and 96, which are exemplary, the wire may be, for example, steel and approximately ⅛ inch in diameter.) Tendon 28 is wrapped under tension, by suitable means and the overlapping ends thereof may be clamped together in conventional manner. For clarity and simplicity of the drawings, in FIGS. 1 and 2, the tendon is shown as a single wire. Reference is made to FIGS. 4, 6 and 7 for an illustration of preferred tendons comprising plural wires. This same remark applies to FIGS. 3, 5, 11 and 12. Where plural wires are used to make up the bands 76, 90 and 96, which are exemplary, the wire may be, for example, steel and approximately ⅛ inch in diameter. Since the form of machinery used to make the wrapping in a large tank is conventional, it will not be described here except to say that it could constitute a tractor or some other moving vehicle which would utilize the surface 26 as the track on which it rides while circling the tank. The wire constituting the tendon would pay out from a spool on the tractor or vehicle, one end of the wire being first attached to the tank wall at its proper place. As the tractor then proceeds about the tank, the wire would pay out from the supply under tension, during its traverse across the pilasters around the tank.

The first reinforcing tendon 28 can desirably be wrapped about the pilasters approximately 3 inches above the level 26. After the tendon is wrapped, then a form board 30 (see FIG. 2) is placed about the tank wall, and rests on the surface 26, being held in upright position by suitable stakes 31. The form board preferably is spaced from the outer wall of the panels 2 a distance of approximately 6 inches. This means that the form board will be spaced approximately 3 inches from the outer face of the pilasters 17. The height of the form board should be approximately 6 inches. Concrete 32 is then cast or poured in the space provided by the form board, thus embedding and protecting the reinforcing wire.

At this point, one of the [most imortant] *more important* and surprising advantages of the invention is now described. In the ordinary course of construction, suitable insulation would be placed on the cast concrete 32 in cold weather in order to prevent its freezing. This insulation would have to remain for a week or more and thus would delay construction and increase cost. In the instant case, this insulation is left on until the concrete has its initial set, a matter of hours, not days. The insulation and form can then be removed and replaced with backfill layer 34 which will protect concrete 32 from freezing while construction proceeds. Backfill layer 34 is placed until top surface 36 (level 3) is reached. This surface can then be used by the vehicle for winding the next reinforcing tendon 38 around the tank and for supporting the form boards 40 by means of the stakes 42. It will be noted that backfill layer 34 will not only prevent concrete 32 from freezing but will also provide superior conditions for long term curing of the concrete. In FIG. 3 the surface 36 is called level 3 to distinguish it from level 2.

After the concrete 44 is poured, a third layer 46 of backfill is put in place on the surface 36, and its top is leveled off to provide level 4 as shown in FIG. 3. Again, the third reinforcing tendon 48 is wrapped about the pilasters, the form board 50 is put in place, held properly by the stakes 52, and the concrete for the third reinforcing circular beam 54 is then poured.

After pouring, a fourth layer 56 of backfill is provided and is leveled at the top as in the previous backfills, to provide level 5. Reinforcing tendon 58 is wrapped about the pilasters 17, form boards 60 are put in place and held there by the stakes 62, and the concrete 64 for the fourth reinforcing beam is then poured.

Finally, for the exemplary tank as shown, a sixth backfill 66 is put in place and level 6 is established thereon, reinforcing tendon 68 is wrapped in place, and by means of the suitable form boards and stake, the concrete 70 of the topmost reinforcing beam is poured. Thereafter, additional backfill 7 can be used, and in this [invention] *instance* insulation may be necessary over the top of the concrete 70.

Thus, the tendons are established as a series of discreet bands encircling the tank horizontally, the bands being spaced vertically from each other.

After the last concrete beam 70 is poured and preferably set, a top 72 may be placed or constructed over the entire tank, following methods conventional in the art.

In the exemplary tank a portion of which is shown in FIG. 1 partly constructed, and as to which FIG. 3 shows the stages of assembly, the height of the reinforcing tendon 28 above the level 2 (FIG. 3) has been given as 3 inches but of course this can be varied if desired. The thickness of the backfill layer 24 has been given as 1 foot approximately. Therefore, the reinforcing tendon 28 will be approximately 15 inches above level 1. The concrete beams 32, 44, 54, 64 and 70 will be approximately 6 inches in height and approximately 6 inches in radial thickness. The embodiment shown presents five reinforcing circular beams, and it will be noted that these beams establish a general horizontal plane, and also that the reinforcing tendons 28, 38, 48, 58 and 68 also form a generally horizontal plane parallel to the general plane established by the reinforcing beams. The tank shown can be 150 feet in diameter, and the circular reinforcing beams are spaced approximately as shown, that is, the positions thereof will be established by the separations of the reinforcing tendons, and if the first reinforcing tendon is approximately 15 inches from level 1, and the last reinforcing tendon is 3 inches from the top of the tank, then the separation of the reinforcing tendons is approximately 4½ feet, allowing for a set down of the bottom edge of the walls of 3 inches into the groove 8. Of course, more beams may be added, or, in a smaller tank, a fewer number of beams may be provided.

In the above, the use of form boards 30 is described. However, as shown in FIG. 12, instead of form boards, after winding the levels of the several successive backfill can be raised to a height indicated in FIG. 12 by numeral 74 equal to the desired top surface of the individual concrete beam. Troughs 75 in the backfill adjacent the tank wall are then prepared around the periphery of the wall, these troughs enveloping the tendons as shown and constituting forms for concrete. The concrete of the collars is then poured in the troughs and allowed to initially set. The next level of backfill is then put in place, and so forth.

Also in the above description, the reinforcing beams have been called such. They are like collars that surround the tank for the purpose of reinforcing it. When the reinforcing tendons are applied with tension, then they apply an inwardly and radially directed force which prestresses the wall of the tank, thus eliminating part or all of the tension which would normally be encountered in the filler units 12 when the tank is filled, if such stressing were not applied.

As pointed out above, by the use of the embankments or levels of earth to cover the concrete of the beams after they have been poured, the beams are protected against sharp changes in weather, and this means that such tanks can be constructed even in the dead of winter in the cold parts of the country with a minimum of time and cost.

For the purposes of providing suitable work surfaces for men, and the equipment used to do the winding, it is suggested that the initial distance of the exemplary inner perimeter of the hole or pit 1 should be approximately 8 feet from the outer wall of the panels 2. From this point on, the wall of the pit or hole can be slanted according to safety and other conventional construction needs.

The reinforcing tendons shown are normally made up of multiple wires placed under tension. The number of wires will depend on the size of the tank, and the outward forces caused by the contained fluid. (See FIGS. 4, 6 and 7.)

Referring to FIG. 4, a reinforcing tendon 76 is shown to be spaced away from the precast panels 2 by the pilasters 17 and is shown to comprise multiple wires. Such wires may be ⅛ of an inch in diameter and are applied uniformly and under tension by means of conventional wire wrapping machinery such as described above. The tendon is encased in a concrete collar or beam 78.

Referring now to FIG. 5, for a second embodiment of the invention, panels 2 like those of the FIG. 1 embodiment are shown, these panels resting on a base 4 in a groove 8 having the water barrier 10, all as in the FIG. 1 embodiment. The base 4 rests on a suitable foundation such as earth 6.

In this embodiment, however, pilasters are not provided. Instead, the filler units 80 are cast, using suitable form boards, so their exterior surfaces are flush with the outer faces of the panels 2. If desired, as shown in FIG. 10, a pilaster may be provided on the inner face and may include water stops.

Again, as in the FIG. 1 embodiment, the levels 2–6 can be provided by means of suitable back-fills such as 24, 34, 46, 56 and 66 of FIG. 1. The levels so established will be used, as in the FIG. 1 constructional details, as tracks or surfaces on which tendon wrapping machinery may operate.

However, in this embodiment, since there are no pilasters which project from the outer face of the panels 2 as spacers for the reinforcing tendons, individual spacers 82 are provided. These could be concrete bricks 2 inches by 4 inches by 8 inches in size. They are placed, as shown, against the outer faces of the panels, as many being used as desired. In the drawing, one is shown on each side of the edges of a panel, in the second circular beam to be constructed. The bricks are placed with their long edge vertical, and they extend outwardly from the tank wall for the thickness of the brick, that is, two inches. The number of bricks is determined by the forces from the reinforcing tendons and the minimum spacing desired between the tendon and the wall.

As the winding proceeds about the tank walls, the bricks are placed in their proper positions, and the winding itself will hold them in place. FIG. 5 shows the first circular reinforcing beam 84 in place, enclosing the reinforcing tendon 86. The spacing bricks 82 are shown in the position that they will occupy after the second layer of backfill (such as layer 34) is provided, with its surface 36 (this layer not being shown in FIG. 5 in order to clarify the FIG. 5 illustration), and the reinforcing tendon 88 is shown in the position it will occupy, holding the bricks 82 in place as the wrapping progresses.

As indicated, after the wrapping is finished, then the second concrete circular beam is cast in place using suitable form boards, in order to encase both the spacers 82 and the reinforcing wire.

FIG. 6 is a section at the spacer showing the concrete bricks 82 (a metal or other type spacer could be used) the reinforcing tendon 90 and the concrete beam 84. In some instances it may not be necessary to space the reinforcing wires from the outer faces of the tank panels. FIG. 7 is a section showing a portion of a third structural embodiment of the invention, in which the reinforcing tendon 96 placed directly against the wall panels 2. After such wrapping is placed, using the backfill layer methods given above for the previous embodiments, the proper form boards are used in which is cast the concrete to form the circular reinforcing beam 98. The successive wrappings of reinforcing wires, and the construction of the reinforcing means, are carried out in accordance with the steps given above for previous embodiments.

Referring to FIGS. 8 and 9, a fourth structural embodiment of the invention is shown, the illustration being that of a portion of a tank during its initial stages of construction. In the previous embodiments, the use of reinforcing tendons which are applied under tension is described. The advantages of such reinforcing are given and such applied tendons are preferred. However, there may be some instances in which the tanks are small or as to which the outward pressure of the enclosed fluids does not require wrapped reinforcing under tension. In such cases, it will be desired to use some form of reinforcing for the concrete collar-like beam, and FIGS. 8 and 9 shows such a formation. In this embodiment, the main advantages are that the successive layer method given above for the previous embodiments is the one to be used, with the resultant saving in construction costs and in time, particularly during extremely cold weather. Therefore, in this embodiment, the base 4 for the tank is provided as in the previous embodiments, and the first layer of backfill material 24 is used as in the previous embodiments, the latter being provided with the first working level 26, that is, level 2 (see FIG. 3). The wall panels 2 are provided as before, and the filler units 80 will be the same as shown in the FIG. 5 embodiment. No spaces and no pilasters are needed in this embodiment. Of course, if water stops are needed, then they may be suitably provided.

Using the level 1 as a suitable work and support surface, and using suitable supports, individual reinforcing rods 102 are placed about the periphery of the tank wall. With the rods thus supported, and with the ends of each rod overlapping the ends of adjacent rods 104, suitable form boards are provided spaced about six inches from the wall of the tank, and about six inches high. Concrete 106 is then poured in order to form a circular collar-like reinforcing beam at this level. Thereafter the next layer of backfill is put in place to provide the next level, and again a collar-like circular beam is constructed in the manner aforesaid.

Referring to FIG. 10, a fifth structural embodiment of the invention is shown, which is applicable, insofar as the type of reinforcing beam is concerned, to all of the previous embodiments. That is, the reinforcement which surrounds the wall of the tank may be that shown in any of the previous embodiments. In this embodiment, the panels 108 are shown, these being precast. During the casting of the panels 108, the plural-finned water stops 19 of the FIG. 1 embodiment are cast into the inner edge faces of the panels. As indicated above, the water stops are the kind shown, for example, in the copending U.S. patent application of Francis X. Crowley, Ser. No. 354,497, filed Apr. 26, 1973, and now abandoned, and are manufactured by several companies, one of which is Weather Guard Enterprises, 2339 Chattertown Avenue, New York, New York.

After the panels 108 are mounted in the manner described for the other embodiments on a suitable base 4, then suitable form boards (not shown) are utilized both on the inside face of the wall to shape the inner pilaster 112 and to contain the filler units which are an integral part thereof.

As indicated above, once the wall is constructed and the pilasters are thus formed, either the reinforcing wires can be wrapped directly against the opposite face of the tank wall, or suitable spacers such as the bricks 82 may be used to space the reinforcing wire from the outer wall of the tank.

Referring to FIG. 11, a third embodiment of the method of this invention is shown, utilizing the separate spacers 82. In this embodiment all of the tendon wrapping is done before casting the concrete beams (by using a wire spacing mechanism), all of the reinforcing tendons being thus placed prior to backfilling. In this way the tank can be tested for tightness with the wall exposed. FIG. 11 shows the tendon wrappings 114 completed, and one exemplary concrete beam 116 is shown as having thereafter been made, other beams remaining to be formed. As in the FIG. 1 embodiment, successive layers of backfill are used to support the forms, facilitate placing the concrete for the beams, (concrete trucks can ride the tracks and place concrete directly into the beam enclosures eliminating the necessity of concrete pumps), and to insulate and cure the concrete. FIG. 11 also shows the backfills being used without the provision of an excavation, the first backfill 118 being shown in full lines, and a prospective second backfill 120 being shown in broken lines, the latter, when in place, to be used as the ramp to support concrete pouring means for the second tendon.

Referring now to FIG. 12, a sixth structural embodiment of the invention is shown. A tank wall 124 is shown which may be made up of the precast concrete panels described above or be cast in place concrete, the tank having a top 126 thereon. Also as previously described, the bottom ends of the precast panels rest on a suitable concrete foundation 128, the latter being placed upon an earth foundation 130. In a circular groove 132 of the base is placed a fluid sealing means 134 on which the bottom ends of the panels rest.

Using the top surface of the ground level 136 as the track for a wire winding machine and a wire spacing mechanism, tendons 138, 154, 162, 166, 167, 168, and 169 are wrapped about the wall of the tank, suitable means being used as described above to space the tendons from the wall. Then, spaced around the bottom portion of the tank wall between the spacers is set in position a layer 140 of compressible material such as sponge rubber of the order of ¼ to ½ inch thick. Thereafter, form boards are placed in position and a circular section 144 of concrete is cast in place up to, for example, the level indicated by dotted lines 146, this concrete section enveloping and protecting tendon 138.

Backfill indicated by dotted lines 148 is then moved into place, and serves as a track way on which are placed form boards which, with the layer 140, form a circular trough about the tank into which is poured concrete to form the concrete circular ring 150 which surrounds the tank as the next section of an abutment. Backfill indicated by dot dash lines 152 is then put in place, and serves as a track on which the concrete for section 156 is cast, this section enveloping and protecting tendon 154.

It will be realized that when a tank is filled with fluid, the outward forces are greatest on the tank wall at the bottom thereof, and lessen as one progresses to the top. Therefore, the tank walls need to be prestressed most at the bottom portions of the tank, and the prestressing itself can be reduced as one progresses vertically upward. Since, for reasons of economy in forming, concrete tank walls are normally as thick at the top as at the bottom, the upper reaches of the tank wall have reserve strength with which to resist the forces of the backfill.

Under such conditions, in order to prestress the tank wall the most at the bottom, larger tendons are applied there. These tension wires or tendons are so gauged as to their inwardly directed forces, that their force, plus the resistive strength of the tank wall itself at the bottom, are sufficient to withstand the outward pressure of the bottom layers of the water or other fluid with adequate safety factors. The inward forces of the backfill when added to the forces of the prestressed tendons themselves frequently are of such magnitude that the tank wall must be extra thick in order to withstand these forces when the tank is empty. This is more costly for in-the-ground tanks, then need be in view of the present invention. The solution to the problem is to place a layer of compressible material such as sponge rubber 140 which has the thickness of ¼ to ½ inch (for example) between the abutting reinforcing wall comprising the members 144 and 150 and 154 which will then "shield" the tank wall 124 itself (at the bottom thereof) from the forces inwardly directly by the earth embankment. Thus, this economical method of shielding the prestressed tank wall from the forces of the backfill provides a substantial saving in concrete in the upper reaches of the wall.

After the aforementioned abutment and reinforcing tendons are applied with the backfill, then the steps given above for constructing the tanks are used, such as providing the next layer of backfill 160, and using this as a track for placing reinforcing beam 164. In similar manner, embankments (backfills) and their circular reinforcing beams are placed up to the maximum level of backfill.

In the above method and construction, it will be observed that the advantage of using the backfill in order to shield the cast concrete beams and abutment sections from inclement weather during setting of the concrete, provides the same advantages as are found in the previous embodiment.

Referring again to FIG. 13, prestressing tendons 168 and 169 have been placed above the maximum level 171 of backfill. They are encased in concrete beams the same as the lower tendons, by using conventional forming and pouring methods. The advantages of using these concrete ring beams above ground instead of the previous method of winding wire directly against the tank wall and covering the wire with pneumatically placed mortar are first that in this invention the wire is spaced away from the wall and can be completely surrounded and encased in vibrated concrete or mortar. Thus the tendon is not dependent (as contrasted to earlier constructions) on the bond between the pneumatic mortar and tank wall for protection against corrosion. Second, the concrete ring beams are outside the tank wall itself and are not subject to the bending stresses in the wall. Leakage through cracks or other defects in the wall cannot reach the tendons and cause corrosion. Third, cost is reduced because equipment required for pneumatically placed mortar is not required. Fourth, the cost of cement finishing is substantially reduced. Fifth, provision for apertures through the wall is significantly simplified. Sixth, concentration of the prestressing wires into the concrete beams simplifies correction of leakage due to honeycomb or cracks in the concrete wall. Heretofore, the prestressing wire which has spread over the entire wall, formed a barrier which severely impeded correction of these defects.

Figure 13:
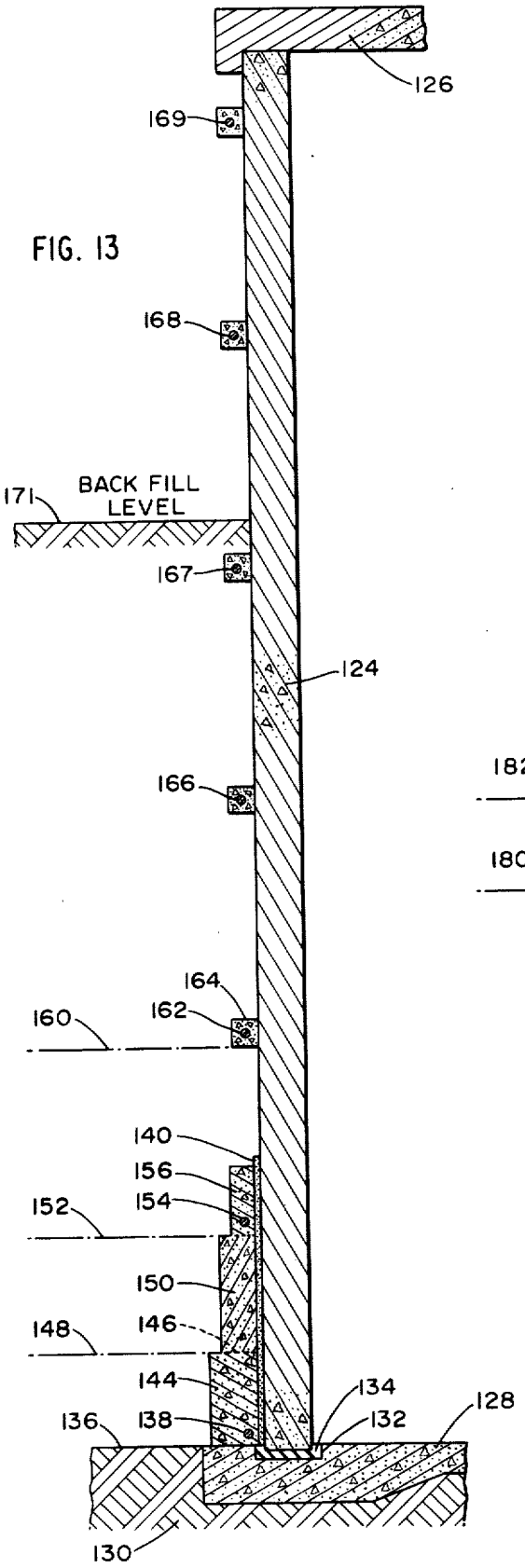
FIG. 13 is an illustration in section of a portion of a tank wall used in a sixth structural embodiment of the invention particularly as to a tank only partially inground.
Figure 14:
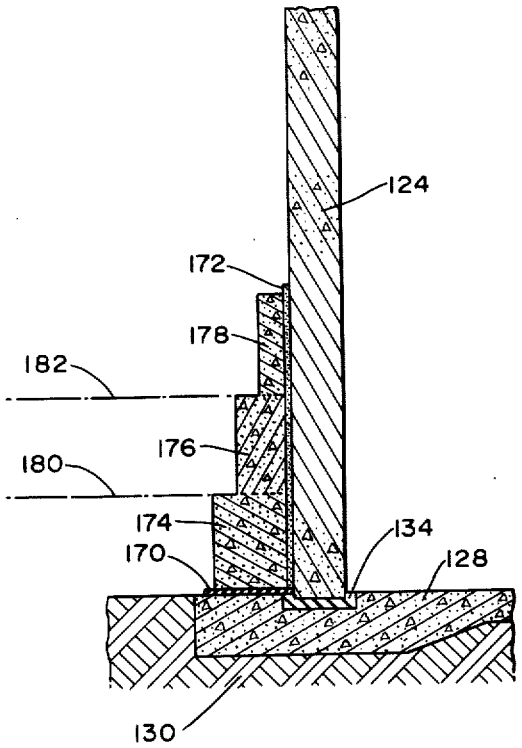
FIG. 14 is an enlarged view of a portion of a tank wall of a seventh structural embodiment of the invention.

Referring now to FIG. 14, a seventh structural final embodiment of the invention is shown, which is the same as the FIG. 13 embodiment in that a prestressed concrete wall 124 is provided along with the concrete platform 128, seal 134, and if desired, an additional seal 170. In this embodiment, the wall 124 is prestressed in the conventional manner and circular beams are not provided. However, a sponge rubber layer in the order of magnitude of ¼ to ½ inch in thickness 172 like rubber layer 140, is placed around the tank wall to a predetermined height. Then, using the backfill layered method given in the previous embodiments, the sections 174, 176 and 178 of the stepped-in reinforcing abutment structure are cast-in-place. The backfill layers for this progressive construction are shown by dotted lines 180 and 182.

As in the previous embodiments, the advantages of the use of the backfills both as a track on which a succeeding reinforcing structure is provided, as well as a means of protecting cast sections of the concrete against inclement weather, are present.

In view of the above it will be seen that the several objects of the invention are achieved and other advantageous results attained.

It is to be understood that the invention is not limited in its application to the details of construction, and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

Having described the invention, what is claimed is:

1. A tank wall comprising:

a multiplicity of precast panels concrete, laterally spaced-apart over their entire thickness, and vertically one-piece integral over the entire height of said wall, cast concrete filler units filling the entire spaces between said panels, a plurality of vertically spaced-apart cast continuous circular concrete beams contiguous with said panels, said beams forming horizontal collars surrounding said wall to reinforce said wall, and metal reinforcing means surrounding said wall and covered by the concrete of said beams, said reinforcing means being in tension while the tank formed by said wall is empty, thereby to stress said wall.

2. The tank wall of claim 1 in which said metal reinforcing means is spaced away from said panels by circumferentially separated spacers, and the concrete of said concrete beams completely surrounds said metal reinforcing means between said spacers.

3. The tank wall of claim 2 in which said metal reinforcing means is a multiplicity of tendons.

*4. A tank wall comprising:*

*a multiplicity of precast panels of concrete, laterally spaced-apart over their entire thickness, and vertically one-piece integral over the entire height of said wall,*

*cast concrete filler units filling the entire spaces between said panels in a circumferential direction,*

*a plurality of vertically spaced-apart cast continuous circular concrete beams contiguous with said panels,*

*said beams forming horizontal collars surrounding said wall to reinforce said wall, and*

*metal reinforcing means surrounding said wall and covered by the concrete of said beams,*

*said reinforcing means being in tension while the tank formed by said wall is empty, thereby to stress said wall.*

*5. The tank wall of claim 4 wherein said cast concrete filler units fill the entire spaces between said panels in a panel thickness direction.*

* * * * *